United States Patent [19]

Aoshima

[11] 4,362,923
[45] Dec. 7, 1982

[54] RICE COOKER

[75] Inventor: Terutaka Aoshima, Toyohashi, Japan

[73] Assignee: Tokyo Shibaura Denki Kabushiki Kaisha, Kawasaki, Japan

[21] Appl. No.: 245,975

[22] Filed: Mar. 20, 1981

[30] Foreign Application Priority Data

Mar. 27, 1980 [JP] Japan .............................. 55-41198[U]

[51] Int. Cl.³ .................................................. F27D 11/02
[52] U.S. Cl. ...................................... 219/441; 99/333; 219/435; 219/492; 219/494
[58] Field of Search ............... 219/429, 430, 433, 435, 219/438, 439, 441, 442, 492, 493, 494, 509, 510; 99/332, 333

[56] References Cited

U.S. PATENT DOCUMENTS 4,313,051 1/1982 Aoshima ............................ 219/441
4,315,138 2/1982 Niwa .................................. 219/441
4,315,139 2/1982 Omishi et al. ..................... 219/441

Primary Examiner—Volodymyr Y. Mayewsky
Attorney, Agent, or Firm—Cushman, Darby & Cushman

[57] ABSTRACT

Disclosed is a rice cooker comprising a pot for containing rice and water, a heater provided at the bottom of the pot for heating the pot, a sensor for sensing temperature of the pot to produce a detecting signal when the temperature of the pot reaches a predetermined value, and a drive circuit which responds to the detecting signal from the sensor to stop the heating of the heater. The drive circuit in the cooker, after the operation start, heats the pot to about 40° C. by the heater for rice immersion, and after keeping the pot warmth constant for a given period, drives the heater at the rated calorific value for rice cooking.

4 Claims, 23 Drawing Figures

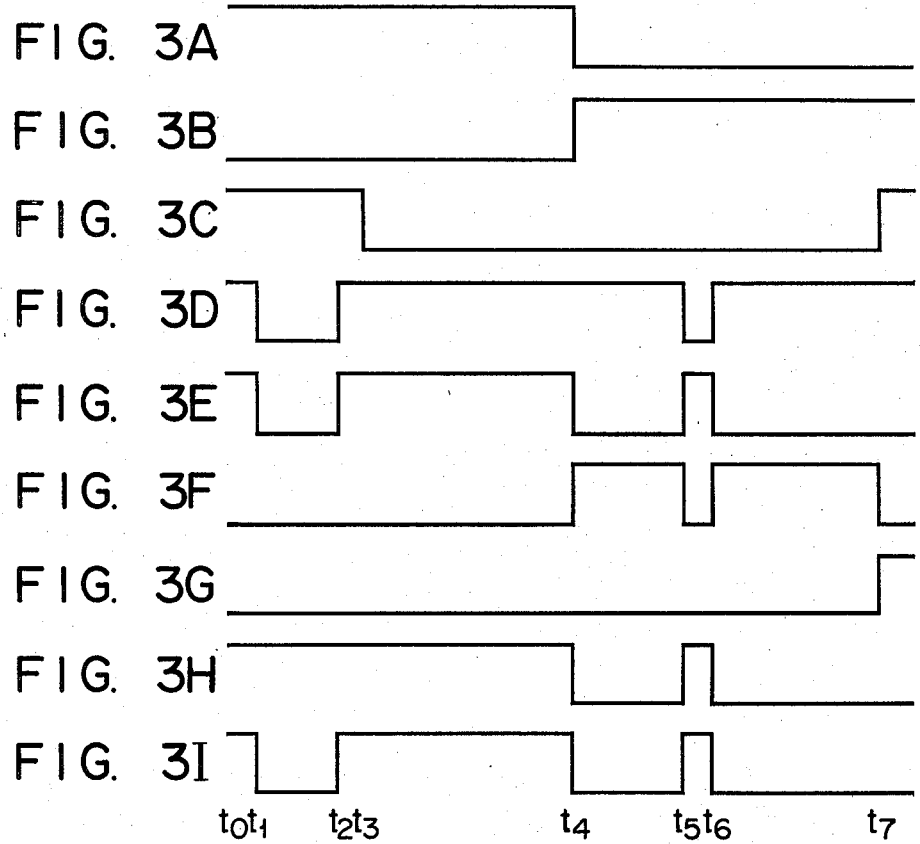
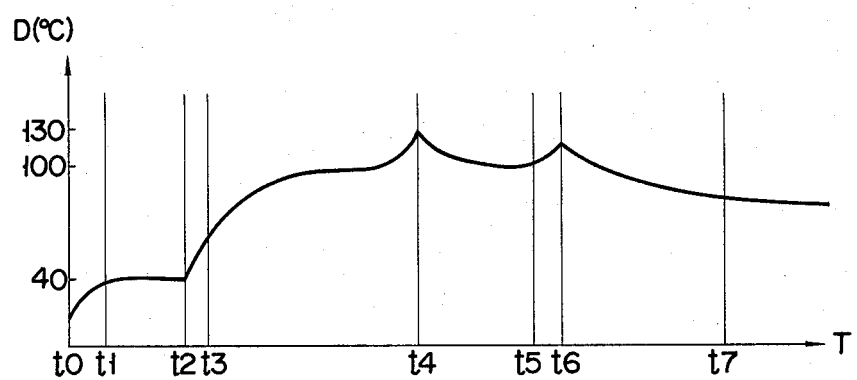
FIG. 4

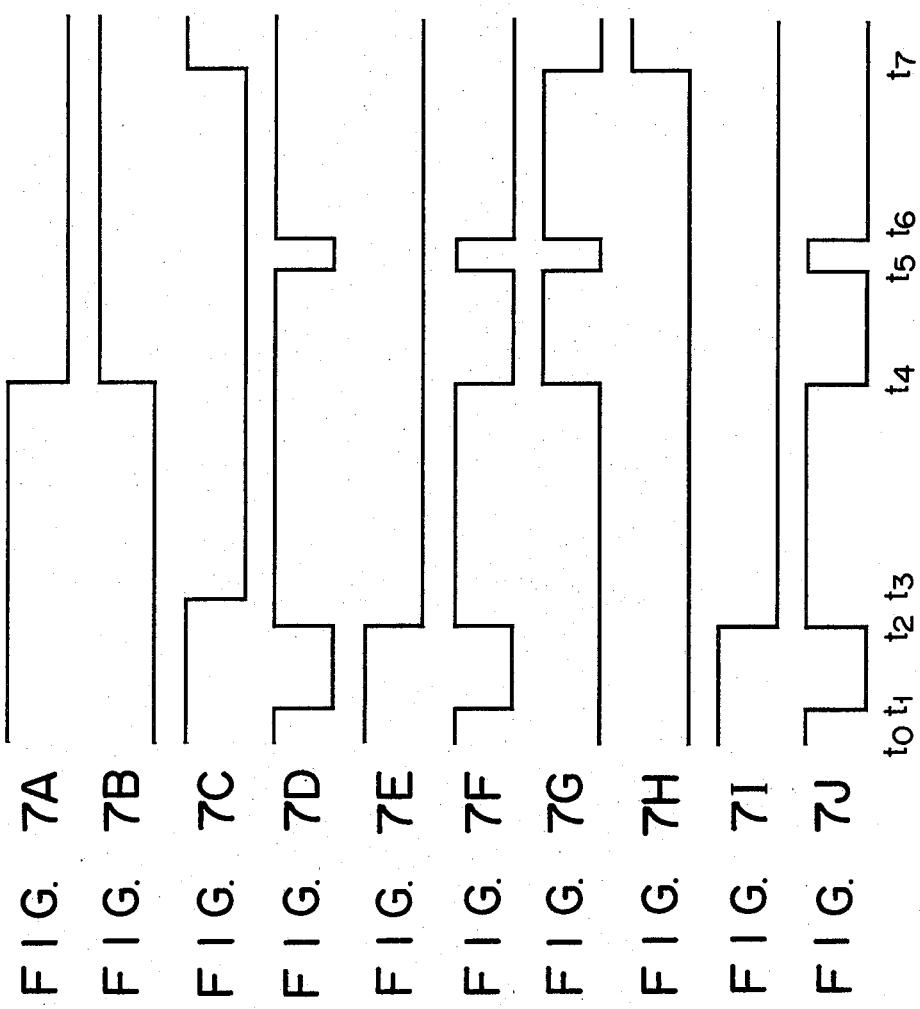

4,362,923

RICE COOKER

The present invention relates to a rice cooker and, more particularly, to a rice cooker which can cook rice under fixed conditions irrespective of ambient conditions.

In rice cooking, it is necessary to immerse rice in water so that the rice satisfactorily absorbs water. The time that the rice must be immersed depends on the degree that the rice absorbs the water. Actually, fluctuations in ambient conditions, such as temperature, make it difficult to select an optimum time.

Accordingly, an object of the present invention is to provide a rice cooker which initiates the rice cooking after the rice absorbs a satisfactory amount of water.

To achieve the above object, there is provided a rice cooker having a pot for containing rice and water. A heater is provided for heating the pot. A detector detects the temperature of the pot to produce a detecting signal when the temperature of the pot reaches a predetermined value. A timer circuit produces a first timing signal during a first predetermined period from the start of the rice cooking operation, and then a second timing signal during a second predetermined period. A drive circuit which responds to the first timing signal drives the heater so as to provide a rated caloric value, drives the heater to provide a caloric value smaller than the rated calorific value in response to the second timing signal, and subsequently drives the heater so as to provide the rated value until the detector produces the detecting signal.

The present invention will be better understood when carefully reading the following description taken in connection with the accompanying drawings, in which:

FIGS. 3A to 3I show a set of waveforms useful in explaining the operation of the drive circuit;

FIG. 4 is a graphical representation illustrating a variation of temperature at the pot bottom;

FIGS. 7A to 7J are a set of diagrams useful in explaining the operation of the third embodiment.

An embodiment of a rice cooker according to the present invention will be described referring to the accompanying drawings.

Figure 1:
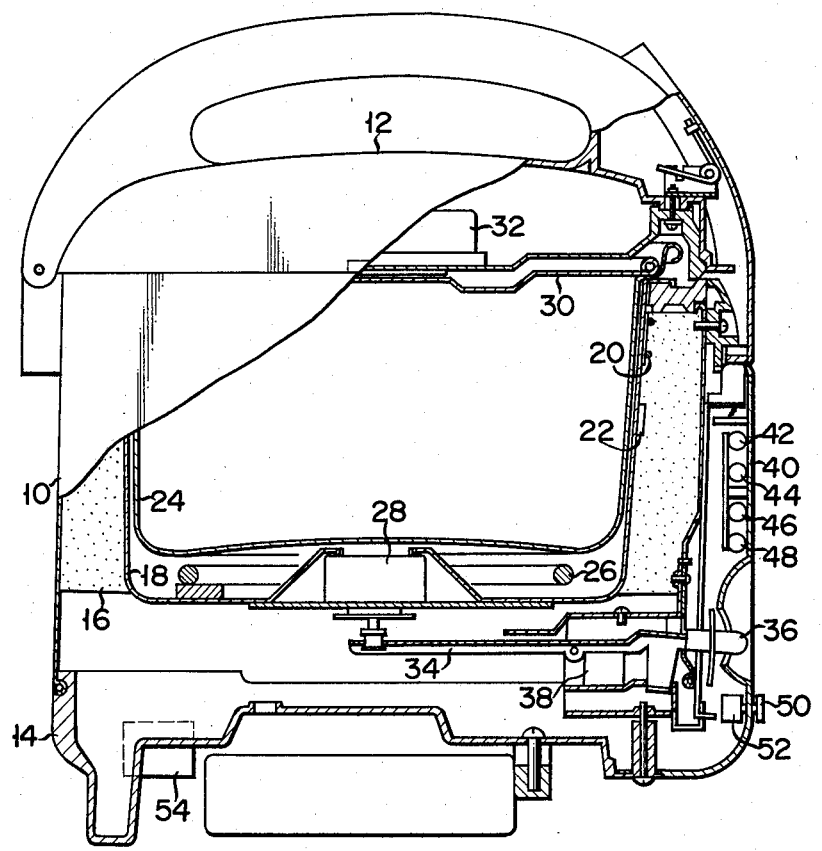
FIG. 1 is a cross sectional view partially broken of an embodiment of a rice cooker according to the present invention.

FIG. 1 illustrates a side view partially broken of the rice cooker. A tubular outer case 10 has an outer lid 12 mounted on the top and a bottom frame 14 at the bottom. Disposed within the outer case 10 is an inner case 18 with a heat insulator 16 interposed between them. Wound around the outer periphery of the inner case 18 is a heater 20 connected to a thermoswitch 22 of the rated output power 50 W. A pot 24 within inner case 18 has an upper edge which hooks the upper edge of inner case 18. A heater 26 having a rated output power of 600 W is helically wound on the bottom of the inner case 18. A temperature sensor 28 is provided at the bottom of the inner case 18. An inner lid 30 is disposed on the top of the pot 24 and a lid heater 32 is disposed on the bottom of the outer lid 12.

The temperature sensor 28, of the magnetic type, is coupled with one end of the operation lever 34, via the bottom of the inner case 18. The other end of the operation lever 34 is coupled with an operation button 36 on the outer wall of the outer case 10. A microswitch 38 is provided near the operation lever 34. The microswitch 38 is actuated through a reciprocating operation of the operation lever 34. A face panel 40, disposed at a part of the surface of the outer case 10, is provided with a rice cooking indication lamp 42, a steam indication lamp 44, a warming indication lamp 46, and an immersion indication lamp 48. A selection button 50, provided on the outer wall of the outer case 10, operates a selection switch 52 within the outer case 10. Disposed on the lower portion of the bottom frame 14 is a drive circuit 54 for controlling the operation of the rice cooker, i.e. the current flowing through the heater.

Figure 2:
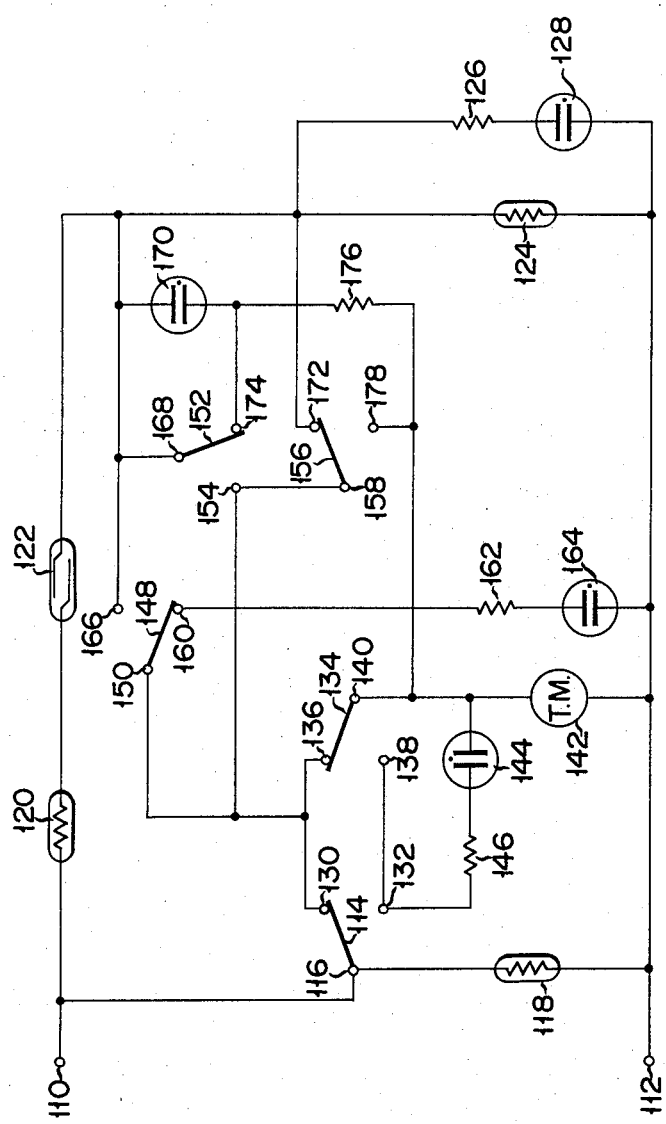
FIG. 2 is a circuit diagram of a drive circuit for driving the rice cooker.

FIG. 2 is a circuit diagram of the drive circuit 54. One power source terminal 110 is connected to the other power source terminal 112, through a fixed contact 116 of a microswitch 114 and a lid heater 118. Also connected between the power source terminals 110 and 112 is a series of warmth keeping heater 120, a thermoswitch 122, and a rice cooking heater 124. A resistor 126 and a rice cooking indication lamp 128 are connected between both ends of the rice cooking heater 124. First and second movable contacts 130 and 132 of the microswitch 114 are respectively connected to first and second movable contacts 136 and 138 of a cam switch 134. A fixed contact 140 of a cam switch 134 is connected to the power source terminal 112, through a timer motor 142, and to the second movable contact 132 of the microswitch 114, through a series circuit of a warmth keeping indication lamp 144 and a resistor 146. The first movable contact 136 of the cam switch 134 is connected to a fixed contact 150 of a selection switch 148, a first movable contact 154 of a microswitch 152, and a fixed contact 158 of a cam switch 156. The first movable contact 160 of the selection switch 148 is connected to the power source terminal 112, by way of a resistor 162 and an immersion indication lamp 164. A second movable contact 166 of the selection switch 148 is connected to a fixed contact 168 of the microswitch 152, one end of a steam indication lamp 170, a first movable contact 172 of the cam switch 156, and a node of the thermoswitch 122 and the rice cooking heater 124. A second movable contact 174 of the microswitch 152 is connected to the other end of the steam indication lamp 170 and one end of a resistor 176. The other end of the resistor 176 is connected to a second movable contact 178 of the cam switch 156 and the fixed contact 140 of the cam switch 134.

In operation, given amounts of rice and water are poured into the pot 24 and the pot 24 is inserted into the inner case 18. The outer lid 12 is closed and electric power is supplied to the power source terminals 110 and 112. Upon depression of the operation button 36, the operation lever 34 moves to set the microswitches 114 and 152 to the state as shown in FIG. 2, i.e. at the side of the first movable contact 130 and the second movable contact 174, respectively. Assume that the cam switches 134 and 156 at the initial state are in a state as shown in FIG. 2. As a result of the operation of the selection button 50, the selection switch 148 is assumed to be set at the side of the first movable contact 160, as shown in FIG. 2.

The heater 124 for rice cooking is electrically energized through a path between the fixed contact 116 and the first movable contact 130 of the microswitch 114 and a path between the fixed contact 158 and the first movable contact 172 of the cam switch 156. The timer motor 142 is driven through a route including a path between the fixed contact 116 and the first movable contact 130 of the microswitch 114 and a path between the first movable contact 136 and the fixed contact 140 of the cam switch 134. At the same time, the rice cooking indication lamp 128 and the immersion indication lamp 164 are also electrically energized. FIGS. 3A to 3D illustrate, in the form of time charts, states of the microswitches 114 and 152, states of the cam switches 134 and 156; FIGS. 3E to 3H lighting states of the indication lamps 128, 170, 144 and 164; FIG. 3I a heating state of the rice cooking heater 124. In FIGS. 3A to 3D, an H level designates the first movable contact side, while an L level the second movable contact side. In FIGS. 3E to 3H, an H level indicates a lighting state, while an L level indicates a non-lighting state. In FIG. 3I, an H level indicates a heating state, while an L level a non-heating state. Heat generated by the 600 W rice cooking heater 124 gradually rises pot bottom temperature D. FIG. 4 illustrates a relationship between the pot bottom temperature D and time T, assuming that a time axis of each of FIGS. 3A to 3I is equal to that of FIG. 4.

At a timing t1 which is 5 minutes after a timing t0 when the timer motor 142 initiates its operation, the cam switch 156 is turned to the side of the second movable contact 178, as shown in FIG. 3D. As a result, the heater 124 for rice cooking stops its heating, as shown in FIG. 3I. At this time, the pot bottom temperature D has reached about 40° C., as shown in FIG. 4. At 40° C., the thermoswitch 122 is still in closed state, so that the warmth keeping heater 120 is supplied with power through the thermoswitch 122 and the heater 124. At this time, since the rice cooking heater 124 is at low impressed voltage and therefore generates no heat as shown in FIG. 3I, and the rice cooking indication lamp 128 does not light up, as shown in FIG. 3E. Therefore, the temperature D is kept at about 40° C. by the 50 W output power of the heater 120, as shown in FIG. 4. This state continues until a timing t2. Accordingly, water temperature in the pot 24 rises to activate the water absorption of the rice, thereby to secure a satisfactory amount of water absorbed by the rice.

At the timing t2 which is 15 minutes after the timing t0 the cam switch 156 is again turned to the side of the first movable contact 127, as shown in FIG. 3D. As a result, the rice cooking heater 124 is heated by the 600 W power output, as shown in FIG. 3I, and the pot bottom temperature D steeply rises, as shown in FIG. 4. At the same time, the rice cooking indication lamp 128 also lights up again, as shown in FIG. 3E.

As a timing t3 which is 16 minutes after the timing t0, i.e., which is one minute from the timing t2, the cam switch 134 is turned to the side of the second movable contact 138, as shown in FIG. 3C, to cease the operation of the timer motor 142. Then, the heat generation of the rice cooking heater 124 boils the water in the pot 24 and the pot bottom temperature D is constant at 100° C. so long as water is present. In a so called dried-up state, the temperature D further rises further. When the temperature D exceeds 130° C. (at a timing t4), the temperature sensor 28 moves the operation lever 34 to change the states of the microswitches 114 and 152. That is, as shown in FIGS. 3A and 3B, the microswitches 114 and 152 are turned to the side of the second movable contact 132 and the first movable contact 154, respectively. Accordingly, current flows through the paths between the fixed contact 116 and the second movable contact 132 of the microswitch 114, and between the second movable contact 138 and the fixed contact 140 of the cam switch 134, into the timer motor 142 which in turn operates again. The heat generation by the rice cooking heater 124 ends, and the rice cooking indication lamp 128 and the immersion indication lamp 164 terminate the lighting. In place of those lamps, the steam indication lamp 170 lights up.

At a timing t5 after 5 minutes from the reoperation timing t4 of the timer motor 124, the cam switch 156 is turned to the side of the second movable contact 178, as shown in FIG. 3D. As a result, the cooking heater 124 is fed with current through a route including a path between the fixed contact 116 and the second movable contact 132 of the microswitch 114, a path between the second movable contact 138 and the fixed contact 140 of the cam switch 134, a path between the second movable contact 178 and the fixed contact 158 of the cam switch 156 and a path between the first movable contact 154 and the fixed contact 168 of the microswitch 152, as shown in FIG. 3I. Then, the pot 24 is heated again, that is, a so called secondary cooking is performed. At this time, the rice cooking indication lamp 128 and the immersion indication lamp 164 light, as shown in FIGS. 3E and 3H.

At a timing t6 after one minute from the timing t5, the cam switch 156 is turned to the side of the first movable contact 172. As a result, the heater 124 ceases its heat generation, as shown in FIG. 3I and the rice cooking indication lamp 128 and the immersion indication lamp 164 go out, as shown in FIGS. 3E and 3H, respectively. Through the microswitch 114, the cam switch 134 and the heater 124, the steam indication lamp 170 is fed with current to light, as shown in FIG. 3F.

At a timing t7 after 9 minutes from the timing t6, i.e., after 5 minutes from the timing t4, the cam switch 134 is turned to the side of the first movable contact 136, as shown in FIG. 3C. The timer motor 142 returns to the initial state after power is shut off and one period of the time restriction operation terminates. As a result, the steam indication lamp 170 stops its lighting and the warmth keeping indication lamp 144 lights up, as shown in FIG. 3G. Subsequently, the pot bottom temperature D falls below a given value, so that the thermoswitch 122 is conductive and the warmth keeping heater 120 is heated at 50 W to keep the warmth.

The operation of the rice cooker according to the present invention will be described when the selection switch 148 is set to the side of the second movable contact 166. At this time, when the operation button 36 is depressed and the microswitches 114 and 152 are set to the states as shown in FIG. 2, the cooking heater 124 immediately is energized. In other words, the operation of the cooker from the timing t2 shown in FIG. 4 starts. Therefore, it is possible to make the rice cooking by omitting the immersion step.

As described above, in the above-mentioned embodiment, water is heated in the pot to provide a good condition for water absorption and immerses the rice for a given period, and then enters the actual rice cooking step. Therefore, high quality cooking of the rice is realized. Further, the immersion period, the rice cooking period, the steam period, and the warmth keeping period are indicated by the corresponding indication lamp, respectively. By this feature, an operator can check the progress of the cooking visually.

Figure 5:
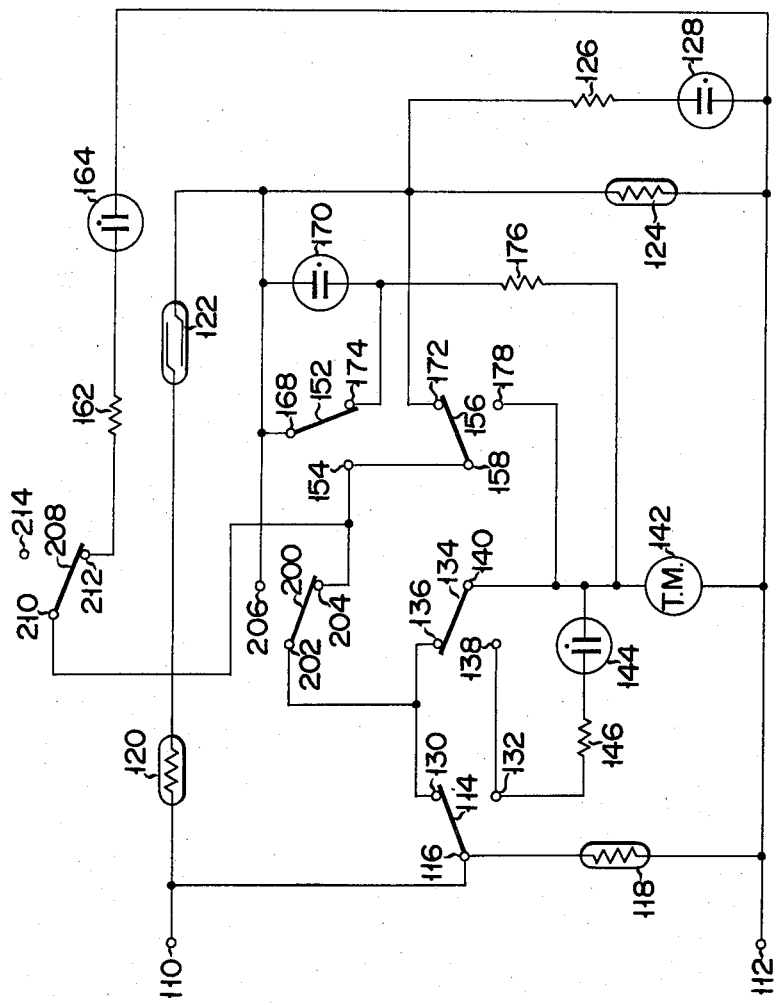
FIG. 5 is a circuit diagram of a second embodiment of a drive circuit according to the present invention.

A second embodiment of a drive circuit for the rice cooker according to the present invention will be described. FIG. 5 is a circuit diagram of the second embodiment. Like numerals are used for indicating like portions in the first embodiment. A first movable contact 130 of a microswitch 114 is connected to a fixed contact 202 of a selection switch 200, a first movable contact 204 of the selection switch 200 is connected to a first movable contact 154 of a microswitch 152, and a second movable contact 206 of the selection switch 200 is connected to a fixed contact 168 of a microswitch 152. The first movable contact 204 of the selection switch 200 is connected to a fixed contact 210 of a selection switch 208 interlocking with the selection switch 208. A first movable contact 212 of the selection switch 208 is connected through a resistor 162 to an immersion indication lamp 164 and a second movable contact 214 is an idle terminal.

Also in the second embodiment, when the selection switches 200 and 208 are turned to the sides of the first movable contacts by the selection button 50 (FIG. 1), as shown in FIG. 5, the circuit operates like the circuit shown in FIG. 2. When the switches 200 and 208 are turned to the sides of the second movable contacts, this circuit condition is equivalent to that when the selection switch 148 shown in FIG. 2 is switched to the side of the second movable contact 166.

Figure 6:
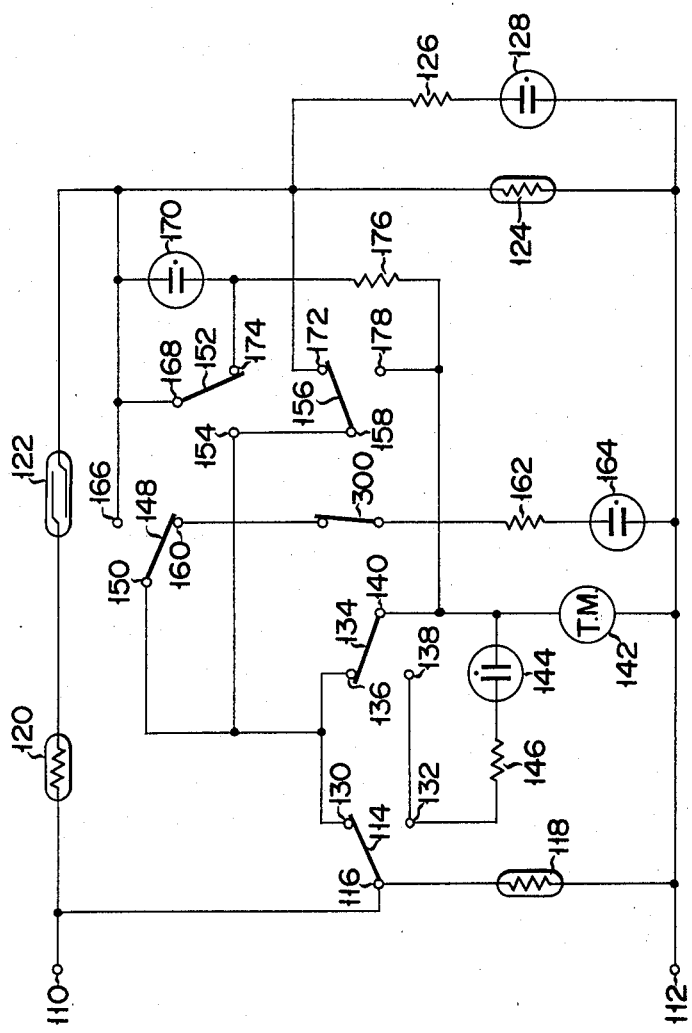
FIG. 6 is a circuit diagram of a third embodiment of a drive circuit according to the present invention.

A third embodiment of a drive circuit for the rice cooker according to the present invention will be described referring to FIG. 6. A principal difference of the third embodiment from the first and second embodiments as mentioned above is that a cam switch 300 is provided between a first movable contact 160 of a selection switch 148 and a resistor 162.

The operation of the present embodiment is graphically illustrated in FIGS. 7A to 7J. FIGS. 7A to 7D illustrate states of the microswitches 114 and 152 and the cam switches 134 and 156, which are the same as those in FIGS. 3A to 3D. FIG. 7E illustrates open and close states of the cam switch 300, in which an H level indicates a close state, while an L level indicates an open state. FIGS. 7F to 7H indicate lighting states of the lamps 128, 170 and 144, and those are the same as FIGS. 3E to 3G. FIG. 7I indicates a lighting state of the immersion indication lamp 164. FIG. 7J shows a heating state of the rice cooking heater 124. In the present embodiment, after the microswitches 114 and 152 are set to the state as shown by the operation button 36 (FIG. 1), that is, the timer motor 142 starts its operation, the cam switch 300 is closed for 15 minutes, as shown in FIG. 7E. Therefore, the immersion indication lamp 164 lights up only during the immersion period, as shown in FIG. 7I.

What is claimed is:
1. An electric rice cooker comprising:
a pot for containing rice and water;
a lid removably covering the top of said pot;
means for heating said pot;
thermally insulating frame means for supporting and enclosing said pot and said heating means;
means for detecting temperature of said pot to produce a detecting signal when the temperature of said pot reaches a predetermined value;
timer means for producing a first timing signal during a first predetermined period from the start of a rice cooking operation and then a second timing signal during a second predetermined period; and
drive means which responds to said first timing signal to drive said heater so as to provide a rated caloric value, to drive said heating means to provide a caloric value smaller than said rated caloric value in response to said second timing signal, and subsequently to drive said heating means so as to provide the rated caloric value until said detecting means produces the detecting signal.

2. A rice cooker according to claim 1, further comprising indication means connected in parallel to said heating means which is lit by said drive means during a period that said heating means is driven.

3. A rice cooker according to claim 2, wherein said indication means is lit only during the first and second predetermined periods of time.

4. A rice cooker according to claim 1, wherein said timer means produces a third timing signal during a third predetermined period after said detecting means produces the detecting signal, produces a fourth timing signal during a fourth predetermined period, and then produces a fifth timing signal during a fifth predetermined period, and said drive means drives responds to said third and fifth timing signals to drive said heating means at a caloric value lower than a rated caloric value, thereby to keep the temperature of the pot constant, and responds to said fourth timing signal to drive said heating means at the rated caloric value.

* * * * *